C. E. & C. W. BURDEAUX.
CHURN.
APPLICATION FILED JULY 15, 1912.
1,054,086.
Patented Feb. 25, 1913.
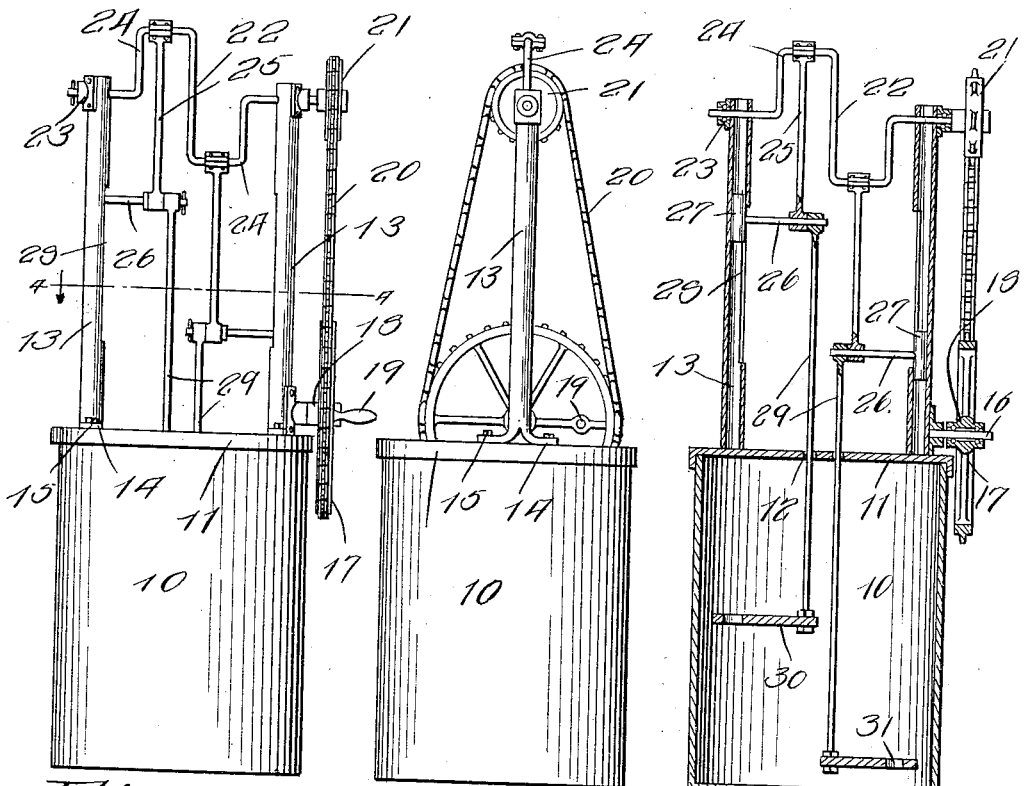
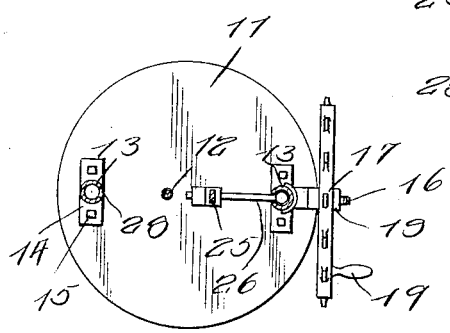
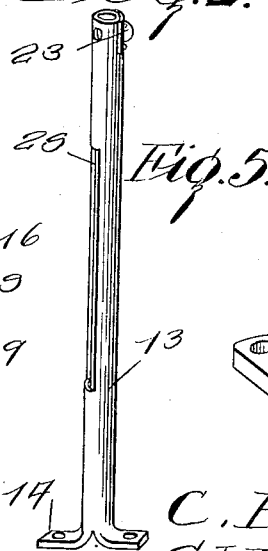
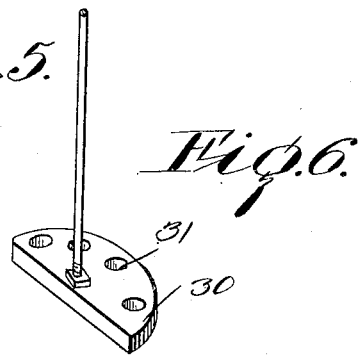
Witnesses
Inventors
C. E. Burdeaux
C. W. Burdeaux

UNITED STATES PATENT OFFICE.

CAREY E. BURDEAUX AND CHARLEY W. BURDEAUX, OF HUNTSVILLE, TEXAS.

CHURN.

1,054,086.          Specification of Letters Patent.          Patented Feb. 25, 1913.

Application filed July 15, 1912. Serial No. 709,532.

*To all whom it may concern:*

Be it known that we, CAREY E. BURDEAUX and CHARLEY W. BURDEAUX, citizens of the United States, residing at Huntsville, in the county of Walker, State of Texas, have invented certain new and useful Improvements in Churns; and we do hereby declare the following to be a full, clear, and exact description of the invention, such as will enable others skilled in the art to which it appertains to make and use the same.

This invention has reference to new and useful improvements in churns and more particularly to a reciprocating churn.

The purpose of the invention is to provide a novel churn structure embodying a pair of oppositely reciprocating dashers mounted in a common churn receptacle or body and operated from a single crank wheel and means are provided for movably supporting and connecting the dasher rods to a crank shaft for guiding said rods in their movements.

The invention further consists in the provision of a machine in which the working parts are supported upon the cover thereof and in which the parts are capable of employment with cream and milk for churning the same into butter in a quick and easy manner and thereby rendering the device specially useful in the absence of a separator.

With the above and other objects in view the invention consists of certain other combinations and arrangements of parts as will be hereinafter more fully described and claimed, it being a still further object of the invention to provide a device which will not be likely to get out of working order.

Figure 1 is a front elevation of our improved churn. Fig. 2 is a side elevation thereof. Fig. 3 is a vertical longitudinal sectional view thereof. Fig. 4 is a cross sectional view on the line 4—4 of Fig. 1. Fig. 5 is a detail perspective view of the standard carried by the cover or lid of the churn body or receptacle. Fig. 6 is a detail view of one of the dasher rods and a dasher carried thereby.

By reference to the drawings in detail, wherein is illustrated the preferred embodiment of the invention, there is shown the churn body or receptacle 10 which may be in the form of a cylindrical jar like receptacle and which is provided with a cover or lid 11 tightly secured on the top of the body and provided with a pair of spaced openings 12 therethrough. Vertically mounted at diametrically opposite edges of the cover and in alinement with the apertures 12 are a pair of tubular standards 13 which at their lower ends are provided with oppositely extended feet portions 14 through which the standards are secured to the cover by screws 15, thus holding the standards in spaced parallel relation.

A stub shaft 16 is secured to the outer face of one of the standards near its lower end and rotatably carries a sprocket wheel or sprocket 17, anti-friction ball bearings 18 permitting rotation of said sprocket wheel with ease and without undue friction while said wheel is further provided with a crank handle 19 through the medium of which the sprocket may be manually rotated. A drive chain 20 is engaged around the sprocket wheel 17 and also is disposed around a smaller sprocket wheel 21 secured to one extremity of a crank shaft 22, the extremities of which are located in ball bearings 23 at the upper ends of the standards 13.

The crank shaft 22 is provided with oppositely extended cranks 24 intermediate of the standards, to which are connected pitmen 25, while the lower extremities of the pitmen are connected to guide arms 26 having vertical cross heads 27 at their outer ends vertically movable in the standards, which latter are provided with vertical slots 28 in their inner faces movably receiving the arms therethrough.

As above specified, the inner ends of the arms 26 are connected to the lower ends of the pitmen 25 while vertically reciprocating dasher rods 29 are connected at their upper extremities to the inner ends of the arms and extend through the openings 12 in the cover or lid of the body or churn receptacle while horizontally arranged dashers 30 are connected to the lower extremities of the dasher rods. These dashers each comprise substantially semi-circular plates having the dasher rods connected thereto adjacent to the central portions of their straight edges and each dasher is provided with a plurality of apertures 31 through which the cream and milk will pass during the reciprocating movements of the dashers.

In the operation of the device, the crank handle 19 is grasped by one hand and rotated, thus imparting increased velocity of rotation to the crank shaft 22 and thereby reciprocating the pitmen 25 through the cranks 24. Reciprocation of the pitmen 25 will reciprocate the dasher rods and dashers carried thereby while the guide arms will move vertically in the standards and insure straight up and down movements of the parts with the least possible friction. Thus, it will be seen that the dashers will be oppositely reciprocated and the contents of the receptacle thoroughly agitated to separate the cream from the whey and cause coagulation of the butter fat which will result in quicker churning of the butter. The device embodies a few simple and novel parts which may be readily taken apart and which can be very economically produced.

Having thus described our invention what we claim is:

1. In a churn, a body, a cover for the body, a pair of tubular standards mounted on the cover and having their lower ends split to provide outturned feed secured to the cover, said standards having vertical slots in their inner portions, cylindrical cross heads working in the standards and having arms extending inwardly through the slots for movement therein, dasher rods connected to the arms and operating through the cover, dashers carried by the rods and means carried by the standards and connected to the arms for oppositely reciprocating the dasher rods and dashers carried thereby.

2. A churn embodying a churn receptacle, a cover for the receptacle, standards mounted on the cover, arms having cross heads slidably supported by the standards, a crank shaft rotatably mounted at the upper ends of the standards, pitmen connected to the crank of the shaft and the inner ends of the arms, dasher rods pivoted to the arms and operating through the cover, dashers carried by the rods and means for rotating the crank shaft.

In testimony whereof, we affix our signatures, in presence of two witnesses.

CAREY E. BURDEAUX.
CHARLEY W. BURDEAUX.

Witnesses:
F. E. HUMPHREY,
L. B. LAMKIN.

Copies of this patent may be obtained for five cents each, by addressing the "Commissioner of Patents. Washington, D. C."